(12) United States Patent
Plow et al.

(10) Patent No.: US 6,657,644 B1
(45) Date of Patent: Dec. 2, 2003

(54) LAYER VIEWPORT FOR ENHANCED VIEWING IN LAYERED DRAWINGS

(75) Inventors: Gregory Maurice Plow, Gilroy, CA (US); Farrokh E. Pourmirzaie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/391,302

(22) Filed: Sep. 7, 1999

(51) Int. Cl.$^7$ .................................................. G09G 5/00
(52) U.S. Cl. ........................ 345/786; 345/790; 345/797; 345/802
(58) Field of Search ................................. 345/798, 769, 345/781, 804, 665, 786, 790, 797, 802, 803

(56) References Cited

U.S. PATENT DOCUMENTS

| | | | | |
|---|---|---|---|---|
| 4,665,555 A | | 5/1987 | Alker et al. ................. 382/305 |
| 4,868,765 A | * | 9/1989 | Diefendorff .................. 345/797 |
| 5,151,974 A | | 9/1992 | Tani et al. .................... 345/428 |
| 5,412,775 A | * | 5/1995 | Maeda et al. ................ 345/797 |
| 5,459,832 A | * | 10/1995 | Wolf et al. ................... 345/769 |
| 5,487,145 A | * | 1/1996 | Marsh et al. ................. 345/501 |
| 5,588,103 A | | 12/1996 | Aoyagi ........................ 345/745 |
| 5,748,174 A | * | 5/1998 | Wong et al. ................. 345/798 |
| 6,002,397 A | * | 12/1999 | Jaaskelainen, Jr. .......... 345/805 |
| 6,072,489 A | * | 6/2000 | Gough et al. ................ 345/803 |
| 6,097,853 A | * | 8/2000 | Gu et al. ...................... 382/282 |
| 6,216,138 B1 | * | 4/2001 | Wells et al. .................. 707/502 |
| 6,219,055 B1 | * | 4/2001 | Bhargava et al. ........... 345/850 |
| 6,224,249 B1 | * | 5/2001 | Ozawa et al. .................. 703/1 |
| 6,246,406 B1 | * | 6/2001 | Nielsen et al. .............. 345/781 |
| 6,429,883 B1 | * | 8/2002 | Plow et al. .................. 345/768 |

FOREIGN PATENT DOCUMENTS

JP        04266178 A   *  9/1992   ........... G06F/15/62

* cited by examiner

*Primary Examiner*—Ba Huynh
(74) *Attorney, Agent, or Firm*—Sawyer Law Group LLP

(57) ABSTRACT

A method and system of displaying graphical images in a computer graphics system is disclosed. In a display of a graphical image including a plurality of graphic layers, the method and system comprise creating a layer viewport in response to a user interaction, associating at, least one of the plurality of graphic layers with the layer viewport and displaying a modified view of the at least one graphical image within the viewport by excluding one or more layers which are not associated with the viewport from view within the viewport. Through the use of a system and method in accordance with the present invention, a user can achieve the desired view of a graphical image or portion thereof. In one aspect of the invention, this view within the viewport facilitates graphic object visualization, selection and modification, unencumbered by the distortion or obfuscation created by the display of layers that are unnecessary for the operation at hand, while preserving a complete view of all the layers in the remainder of the drawing. Another aspect of the present invention provides for the creation of a complete view of an image in one portion of the drawing to facilitate detailed examination of a complete component while retaining a simplified view in the remainder of the drawing for convenient editing.

18 Claims, 7 Drawing Sheets

LAYER VIEWPORT FOR ENHANCED VIEWING IN LAYERED DRAWINGS

FIELD OF INVENTION

The present invention relates generally to a system and method for the use of an application tool that allows the user to view and/or edit specific portions of a layered drawing with a modified view.

BACKGROUND OF THE INVENTION

Computer graphics systems for the desktop are being used more and more by engineers, architects, scientists and others for the creation of highly complex images and drawings. Frequently these computer graphics systems provide "layer" support to enable the computer graphics user to deal with increased drawing complexity. For example, the architect may utilize one layer of a drawing for the wiring diagram and another layer of the drawing for heating and cooling systems, and a third for framing detail of the home construction. FIG. 1 represents a conventional layered diagram 10. The diagram 10 is comprised of a first layer 12, a second layer 14, and a third layer 16. "Layers" enable the user to see a simplified view of the drawing to facilitate the editing or creation of a particular aspect or component of the drawing. The user may view all layers of the drawing at one time or specify that certain layers are to be "invisible" and/or "locked". The "locked" state prevents accidental modification of a layer or component of the drawing when the user is intending to only perform modifications on another layer or layers. The invisible state simplifies the view enabling the user to see just those aspects of the drawing that he is currently concerned with.

While this is a most valuable feature on computer graphics and CAD systems, there are limitations and problems with its current usage. One difficulty lies in the fact that the designation of which layers are visible and which layers are invisible applies to the entire drawing or file which has been opened by the user. This presents a particular problem when the user wishes to view only a single layer generally, but momentarily wishes to view one or more other layers in a particular portion of the drawing. In today's layer technology, the user must temporarily make visible the needed layers for the entire drawing.

For example, referring back to FIG. 1, assume the user is viewing one layer 12 of his drawing. Also assume this user needs to view one portion 11 of all the layers. Conventional methods available to the user require him to display the complete view for the entire drawing 10, even though the user only needs to see all the layers of the one portion 11. This introduces a lot of additional complexity in all areas of the drawing in addition to just the selected portion 11 that was desired by the user. This complexity, distortion and obfuscation in all areas of the drawing rather than just the selected portion may result in the user losing orientation within the drawing, slowing the speed with which changes are made and increasing the risk of error.

The user may also be viewing multiple layers concurrently but momentarily wishes to view a portion of the drawing with fewer or different layers. A similar problem arises in that the user is forced to adjust which layers are visible for the entire drawing. This may cause a loss of the detail to be displayed in the drawing, which may result in the user losing orientation within the drawing or missing essential detail. This deficiency can reduce the speed with which changes are made and increase the risk of error. Accordingly, what is needed is a tool to facilitate viewing the appropriate layers in only the portion of the drawing for which the modified layer view is desired.

SUMMARY OF THE INVENTION

A method and system of displaying graphical images in a computer graphics system is disclosed. In a display of a graphical image including a plurality of graphic layers, the method and system comprise creating a layer viewport in response to a user interaction, associating at least one of the plurality of graphic layers with the layer viewport and displaying a modified view of the at least one graphical image within the viewport by excluding one or more layers which are not associated with the viewport from view within the viewport.

Through the use of a system and method in accordance with the present invention, a user can achieve the desired view of a graphical image or portion thereof. In one aspect of the invention, this view within the viewport facilitates graphic object visualization, selection and modification, unencumbered by the distortion or obfuscation created by the display of layers that are unnecessary for the operation at hand, while preserving a complete view of all the layers in the remainder of the drawing.

Another aspect of the present invention provides for the creation of a complete view of an image in one portion of the drawing to facilitate detailed examination of a complete component while retaining a simplified view in the remainder of the drawing for convenient editing.

DETAILED DESCRIPTION OF THE INVENTION

Figure 1:
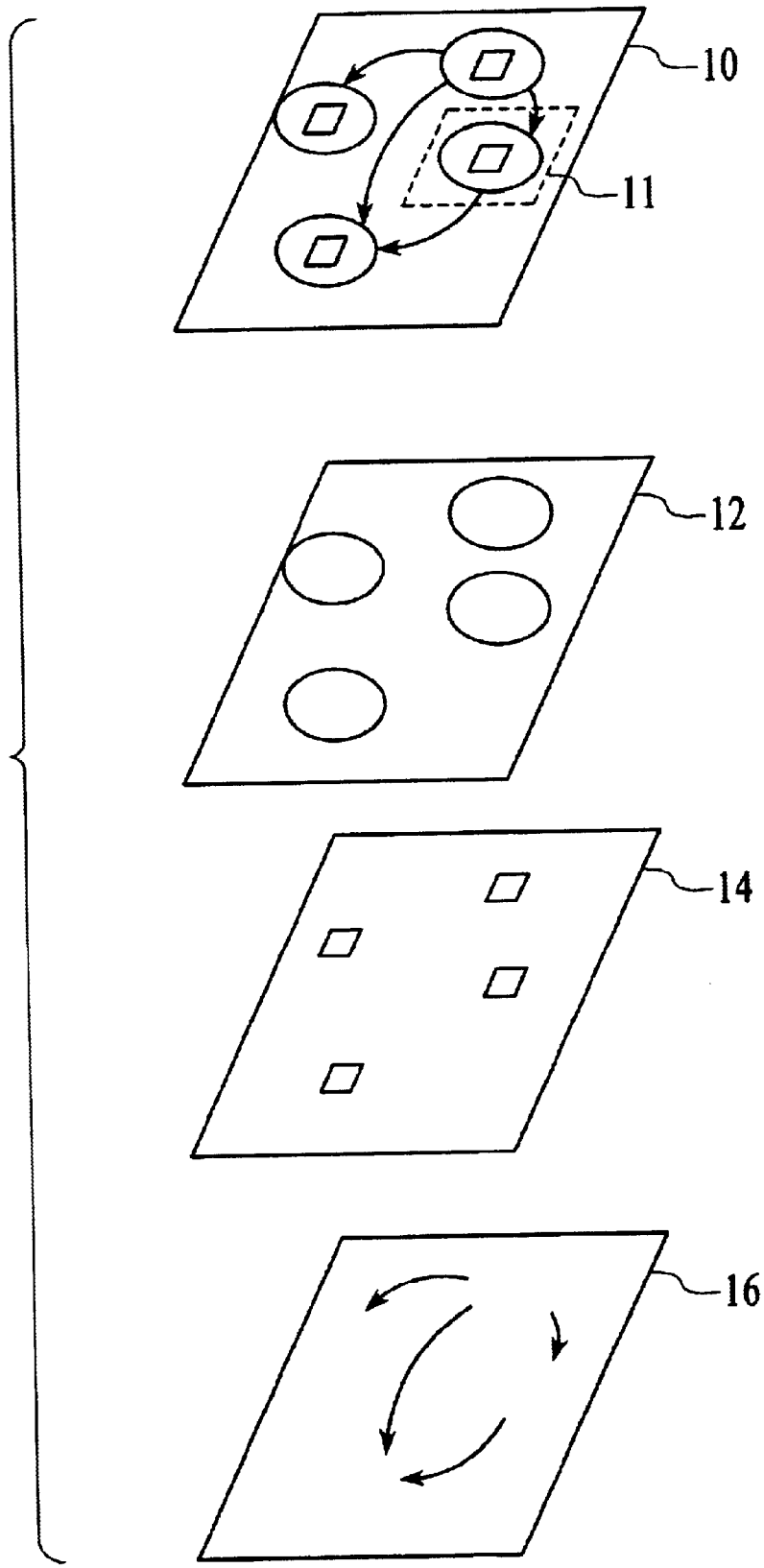
FIG. 1 shows a conventional layering scheme in a graphical image.

The present invention provides a method and system for displaying a modified view of a portion of a layered drawing. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments shown but it is to be accorded the widest scope consistent with the principles and features described herein.

A method and system in accordance with the present invention is disclosed in the context of a preferred embodiment. The preferred embodiment allows for the implementation of a layer viewport that provides a user the ability to create modified views of specific portions of layered drawings. These modified views facilitate particular actions to be taken in a portion of a drawing while preserving the original user-established viewing mode for the remainder of the drawing.

Figure 2:
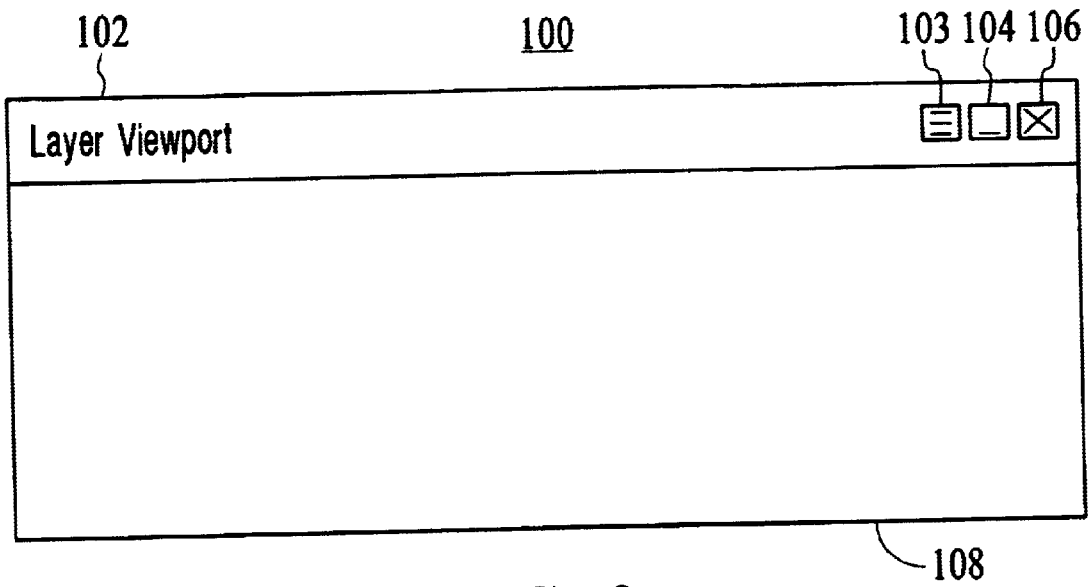
FIG. 2 shows a layer viewport in accordance with the present invention.

In a preferred embodiment, a layer viewport is created using an application tool that can be selected by the user. Preferably, the tool is located within an application toolbar. FIG. 2 represents a layer viewport 100 in accordance with the present invention. The viewport 100 includes an area 108 for encompassing a portion of a drawing where a user intends to create a more appropriate view and a toolbar 102. Within the toolbar 102 is a minimize all button 103, a minimize button 104 and a close button 106.

The minimize button 104 allows the user to make the layer viewport temporarily invisible by preferably reducing it to an icon in the operating system taskbar. By clicking the icon in the taskbar, the layer viewport is toggled back to the visible state. The related minimize all button 103, preferably makes all layer viewports temporarily invisible preferably by reducing them to an icon in the operating system taskbar. By clicking this icon all the layer viewports are toggled back to the visible state. Also, if any editing operations are performed, activation of the close button 106 prompts the user either accept or discard any changes made to the drawing.

Once the tool is selected, the layer viewport 100 is created in a default size and location. The layer viewport 100 may alternatively be created using the conventional "click, hold, and drag" method. Once the layer viewport 100 is created, the user preferably uses conventional operations to move and/or size the viewport 100 to the area of the image or drawing to be edited or examined with a modified view. The modified view within the viewport is established by the user according to his needs. Accordingly, the modified view affects only what is displayed to the user in the viewport and does not affect the actual image.

Figure 3:
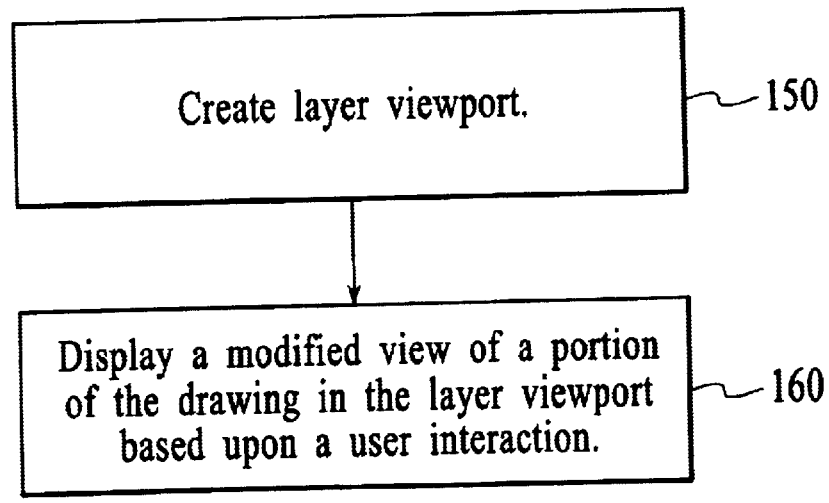
FIG. 3 is a high-level flowchart of the method in accordance with the present invention.

To more particularly describe the operation of the method and system in accordance with the present invention, refer now to FIG. 3. FIG. 3 is a high-level flowchart of a system in accordance with the present invention. First, in a display of a graphical image comprising a plurality of layers, a layer viewport is created in response to a user interaction, via step 150. Next, a modified view of a portion of a drawing is displayed within the layer viewport based upon a user interaction, via step 160.

Figure 3A:
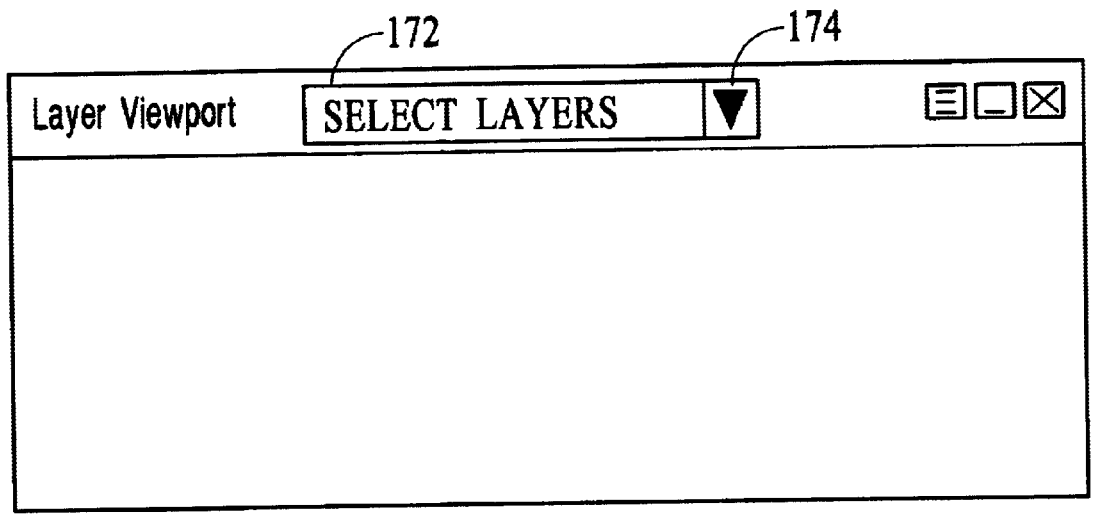
FIG. 3a shows a layer flyout configuration in accordance with the present invention.
Figure 3B:
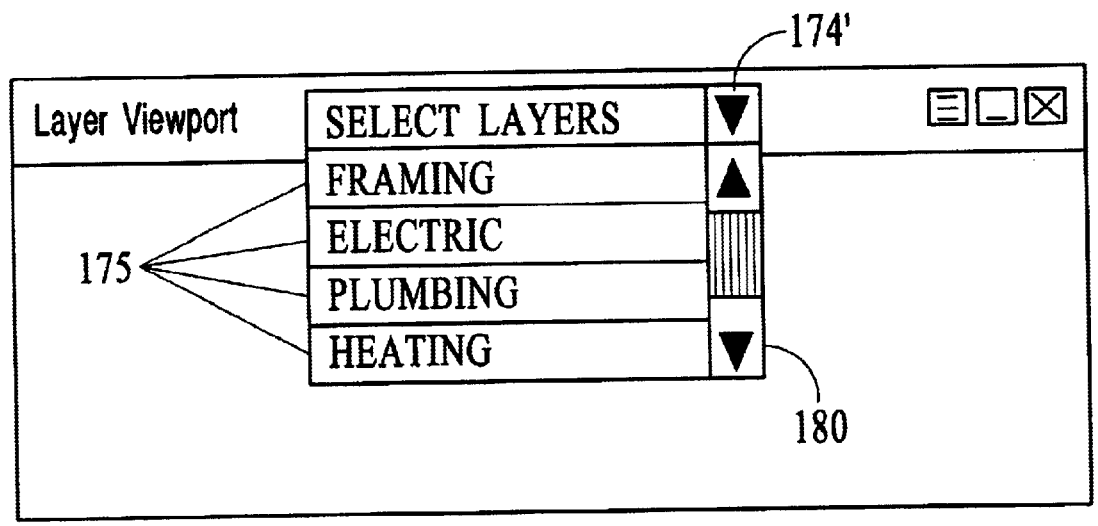
FIG. 3b shows an expanded layer flyout configuration in accordance with the present invention.

When the user is ready to create a modified view, the user must "associate" the layers to be viewed with the viewport. The layer viewport only displays graphical image layers that are associated with it. All other layers of the drawing are excluded from view within the viewport. To better understand the association feature, please refer to FIG. 3a. Preferably, this association is accomplished by a layer flyout 172. Upon clicking the flyout button 174, the layer flyout 172 expands as shown in FIG. 3b. The expanded flyout 180 contains the names of the layers 175 associated with the user's drawing. The layer names may have been specified by the user, or they may be default names generated by the system. The user then left clicks the mouse on the layer(s) he wants to display in the layer viewport. Note that while the new simplified view is displayed within the viewport, no actual changes have been made to the drawing.

If the user wants a particular layer(s) to be locked within the viewport, the user can preferably right click the particular layer(s). Preferably, the user can depress the "CTRL" key in combination with the mouse selection to continue making multiple selections. In the absence of depressing the "CTRL" key, a left mouse click on a particular layer will select that layer while deselecting all the other layers. Otherwise, by left clicking any previously selected layer with the "CTRL" key depressed will deselect that layer. When selections are made within the layer flyout 180, those selection choices preferably become highlighted so the user can easily determine what layer(s) comprise the view within the viewport. Mouse clicking the flyout button 174' again preferably collapses the layer flyout 172, and the selected layer(s) are displayed in the viewport.

Whenever a layer viewport is moved about on the desktop, the viewport continues to display only the portions of the associated layers that are currently beneath the viewport. If the viewport reaches a portion of the drawing where no information exits for the associated layers, the viewport displays a solid background color defined for the drawing. Preferably, as a layer viewport is dragged on the desktop in a horizontal direction and the boundary of the drawing application window is reached, the drawing scrolls in that same horizontal direction, simulating the effect of allowing the layer viewport to move unabated to the desired area of the drawing. In like fashion, vertical scrolling occurs when the layer viewport is moved on the desktop in the vertical direction and the viewport reaches the boundary of the application window. Intervening layers not associated with the layer viewport do not effect the displayed results within the layer viewport in any way. Preferably, information displayed within the layer viewport, if not in a locked state, may be edited with the same tools and procedures available for editing outside of the layer viewport.

Figure 4:
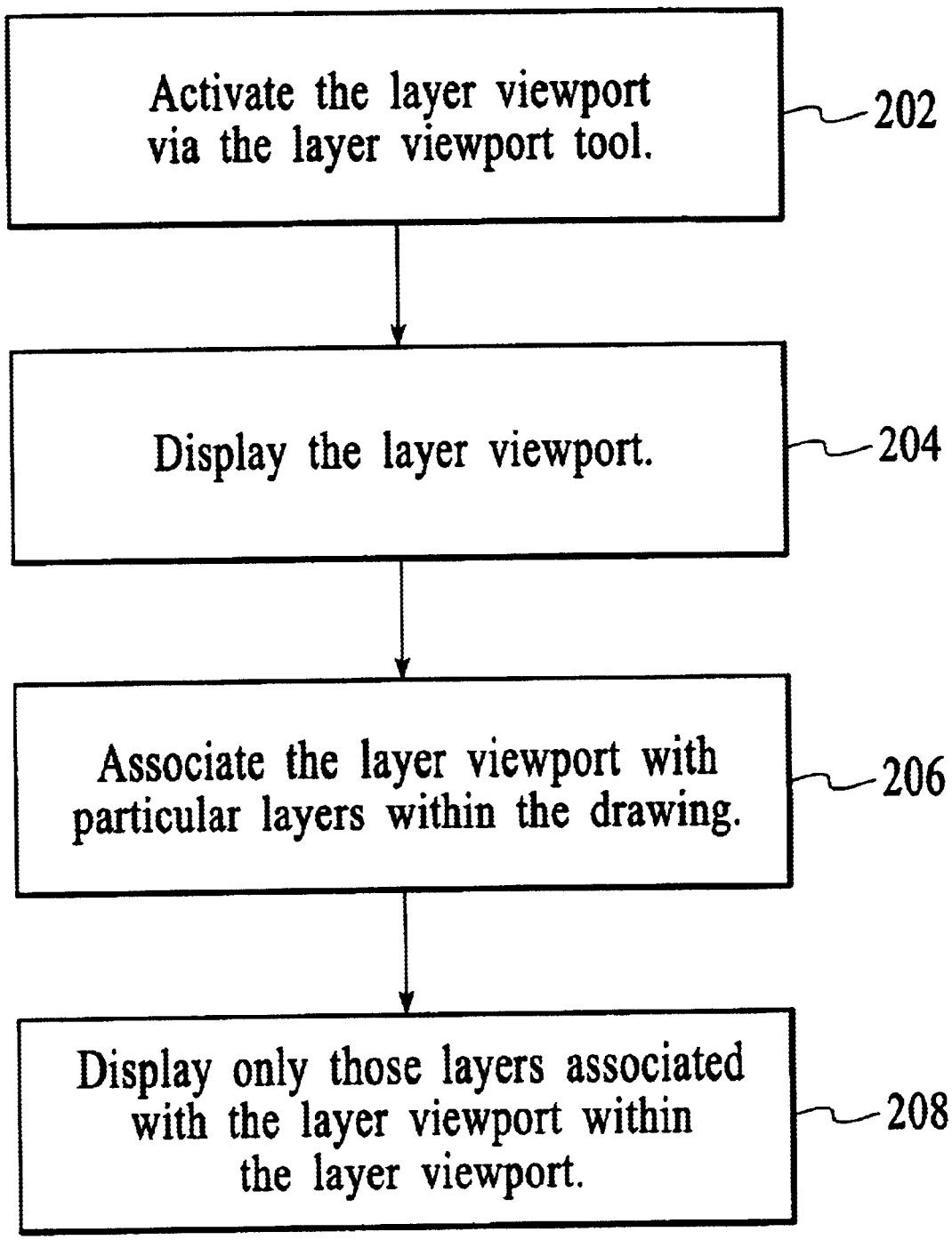
FIG. 4 is a detailed flowchart of the method in accordance with the present invention.

To more specifically describe the operation of the present invention FIG. 4 is a detailed flow chart of a method in accordance with the present invention. Once a user decides to see a modified view of a drawing, the layer viewport tool is activated, via step 202. This is preferably done by selecting a tool located within an application toolbar. Next, the viewport is displayed, via step 204. Preferably, the viewport is a default size and location. However, the viewport can be moved and resized using conventional mouse operations. Particular layers of the drawing are then associated with the layer viewport in response to a user interaction in order to display a modified view in the layer viewport, via 206. Next, the layer viewport displays only the portions of the associated layer(s) that are within the viewport, via step 208. Thus, the user can view a modified view of a specific portion of a layer(s) without having to view a modified view of the entire drawing. Also, information displayed within the layer viewport may be edited with the same tools and procedure available for editing outside of the layer viewport.

Figure 5:
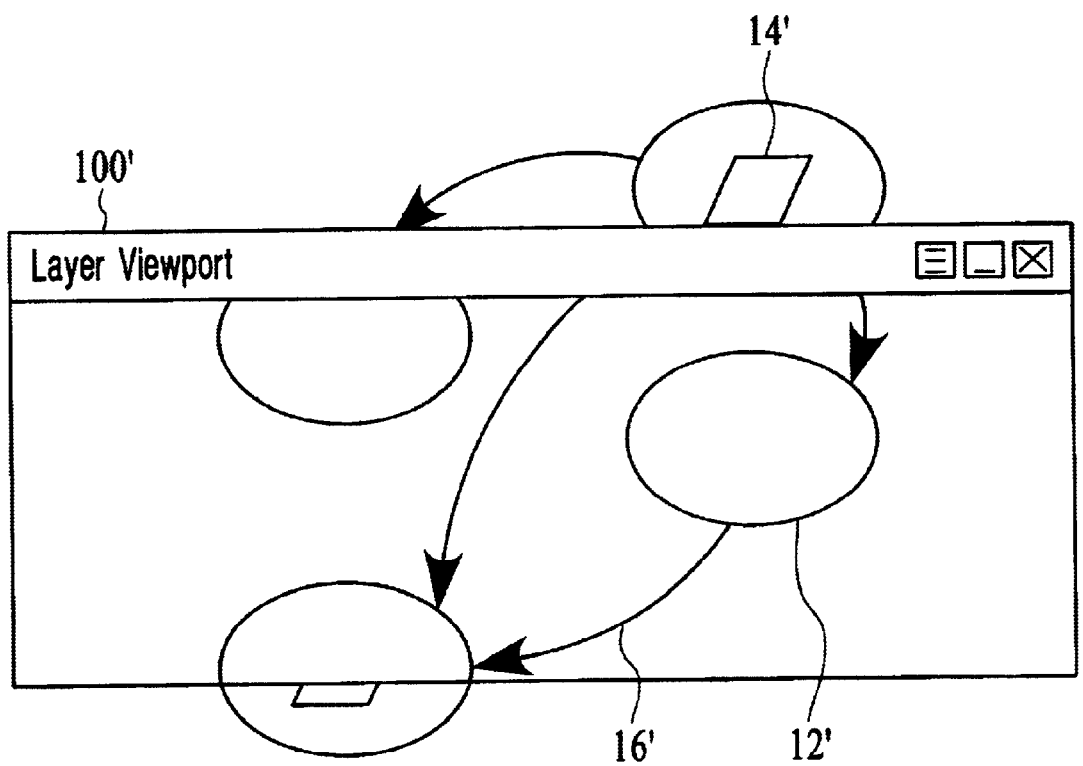
FIG. 5 is an example of a system in accordance with the present invention.

FIG. 5 shows an example of the method and system in accordance with the present invention. In this example, the layer viewport 100' displays a modified view of the layered drawing 10 of FIG. 1. Here, the modified view includes the first layer 12' and the third layer 16'. The second layer 14' is excluded from the viewport 100'. Furthermore, the portions of the excluded layer 14' are visible outside of the viewport 100'. As a result of the present invention, a user no longer has to change the view of the entire drawing in order to change the view or just a portion of the drawing. Utilizing a layer viewport in accordance with the present invention, the user can view specific portions within a drawing comprising specific layers according to the user's needs.

Figure 6:
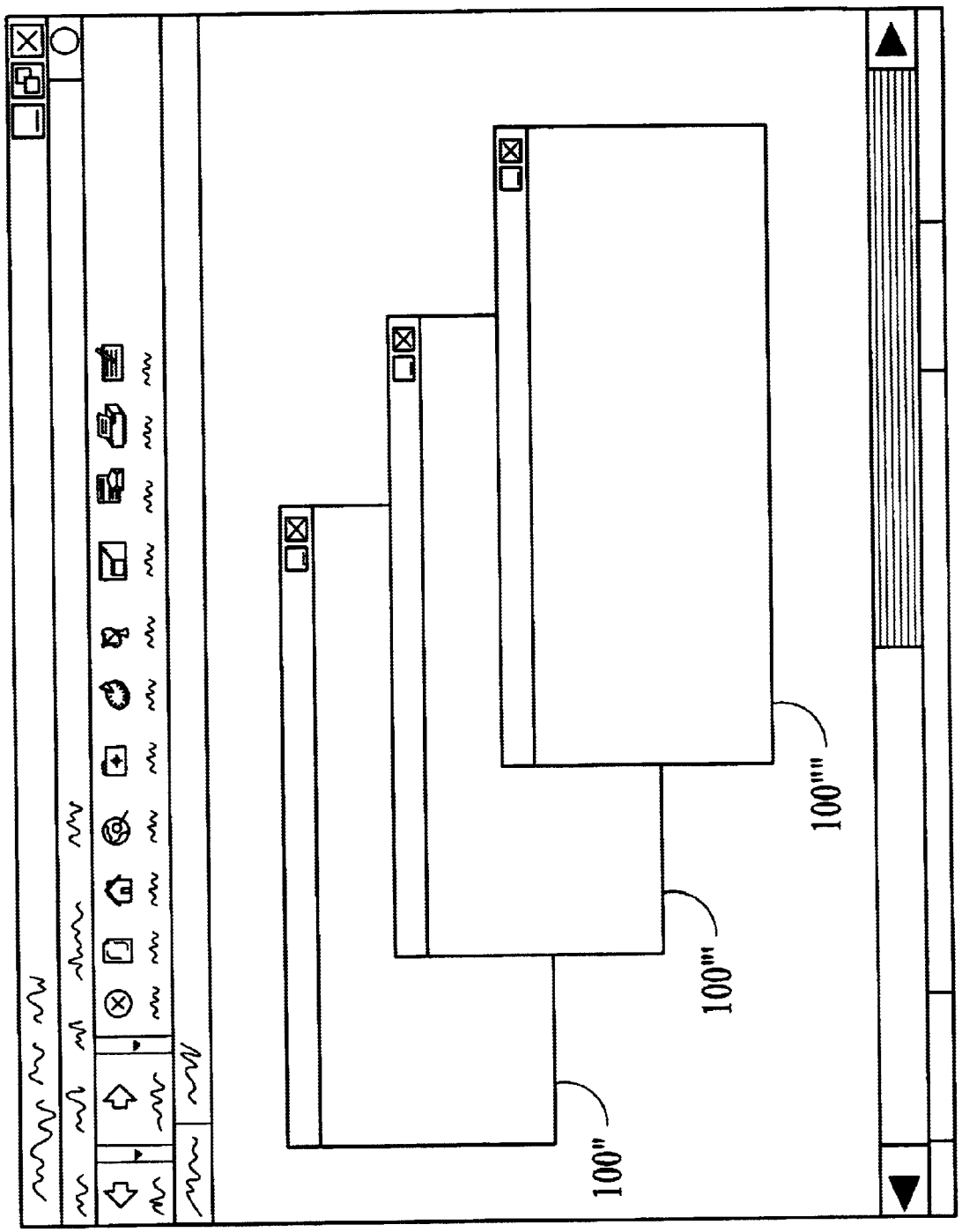
FIG. 6 is another embodiment of the system and method in accordance with the present invention.

FIG. 6 illustrates another embodiment of a method and system in accordance with the present invention. In the embodiment of FIG. 6, the user has the ability to activate multiple layer viewports 100", 100"', 100"". However, only one viewport at a time is "active" in the sense that particular layers of the drawing can be associated with it. Preferably, a layer viewport may be activated be simply moving the cursor to a position inside the desired viewport and left clicking the mouse however one of ordinary skill in the art will readily recognize that a variety of methods could be used to activate a layer viewport while remaining within the spirit and scope of the present invention.

A further enhancement of the layer viewport provides for "capturing" needed information when it becomes visible within the layer viewport. This is preferably accomplished by "right clicking" the mouse within the layer viewport. The graphics or information displayed within the layer viewport is now frozen and constant and can be relocated anywhere on the desktop by simply moving the viewport by conventional means to any desired location on the desktop. This allows the user to capture modified views of portions of the drawing at various locations within the drawing and then collect them together by moving each viewport to a single area of the desktop for easy reference. It is important to note that this capture and relocation process does not change the actual drawing in any way. It simply provides a method for capturing views of portions of the drawing that can be relocated to areas of the desktop for convenient reference. This feature is useful even if the user has associated the same layers in the layer viewport as the visible layers in the drawing. That is in this case the viewport does not produce a modified view but still allow "right clicking" to capture and relocate together disparate portions of the drawing for convenient reference.

Figure 7:
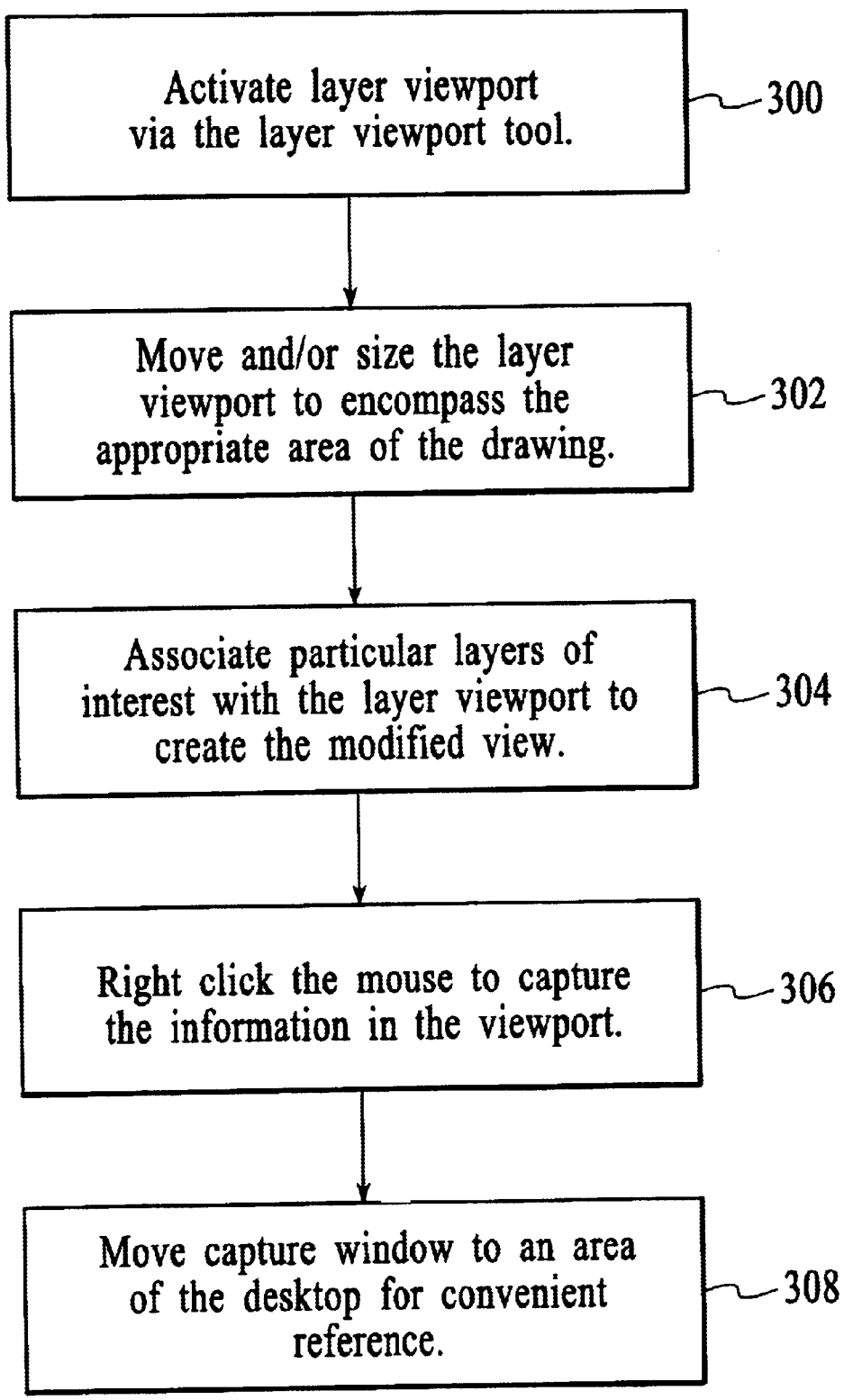
FIG. 7 is a detailed flowchart of the capture enhancement of the method in accordance with the present invention.

To describe the operation of the "capture" enhancement, refer now to the flowchart of FIG. 7. Initially, once a user decides to capture information from a particular portion of a drawing, the user activates the layer viewport tool, via step 300. Next, the layer viewport is created and appropriately moved and/or sized by conventional means to encompass the desired portion of the drawing, via step 302. The user then associates particular layers of interest of the drawing with the layer viewport, via step 304. Once the appropriate modified view is displayed within the layer viewport, the user "right clicks" the mouse, via step 306. The "captured" information can now be relocated to anywhere on the desktop, via step 308.

Note that once the capture occurs, the viewport is just like an informational viewport that can be moved about. This contrasts greatly with the "active" layer viewport where moving the viewport about the drawing results in the real time display of the associated layers in the underlying drawing. For example, if an architect wants to compare the wiring configuration in one portion of the drawing to that of another, he can use the layer viewport to "capture" the wiring configuration in the one portion, and move it to the other portion of the drawing for the comparison.

The modified view provided by the layer viewport can be used to facilitate many needs. One such need is the selection and modification of graphic objects in a particular area of the drawing, unencumbered by the distortion or obfuscation created by layers that are unnecessary to the operation at hand while still preserving the preferred view in the remainder of the drawing. Accordingly, the user will not be burdened by having to distort the view of the entire drawing in order to facilitate an operation in one portion of the drawing.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed:

1. A method for displaying at least one layer of a plurality of overlapping layers of at least one portion of a layered drawing, comprising the steps of:

(a) displaying in a primary window the layered drawing in an unmodified view, wherein the unmodified view displays a composite view of the plurality of overlapping layers;

(b) providing a viewport to define a first portion of the layered drawing;

(c) selecting the at least one layer from the plurality of overlapping layers to associate the at least one layer with the viewport; and (d) displaying in the viewport a modified view of the first portion of the layered drawing, wherein the modified view displays only the at least one layer selected.

2. The method of claim 1, wherein the providing step (b) comprises:

(b1) invoking a layer viewport tool to create the viewport;

(b2) positioning the viewport over the first portion of the layered drawing; and (b3) sizing the viewport to define the first portion of the layered drawing to be displayed.

3. The method of claim 1, further comprising the step of:

(e) providing at least one other viewport for defining at least one other portion of the layered drawing to display.

4. The method of claim 1, further including comprising the step of:

(e) moving the viewport to a second portion of the layered drawing;

(f) displaying only the at least one layer selected of the second portion of the layered drawing in the viewport; and (g) restoring the first portion of the layered drawing to the unmodified view.

5. The method of claim 1, wherein the selecting step (c) comprises:

(c1) providing a list of the plurality of layers in a flyout window;

(c2) choosing the at least one layer from the list; and (c3) associating with the viewport only the at least one layer chosen.

6. The method of claim 1, further comprising the step of:

(e) modifying one or more of the at least one layer selected displayed in the viewport.

7. The method of claim 6, further comprising the step of:

(f) saving the modifications to the one or more selected layers; and (g) closing the viewport.

8. The method of claim 1, further comprising the step (e) locking one or more of the at least one layer selected displayed in the viewport, such that the one or more locked layers cannot be modified.

9. The method of claim 1, further comprising the steps of:

(e) freezing the display in the viewport;

(f) repositioning the frozen viewport to another location on the primary window; and (g) restoring the first portion of the layered drawing to the unmodified view.

10. A computer readable medium containing program instructions for displaying at least one layer of a plurality of overlapping layers of at least one portion of a layered drawing, the program instructions for:

(a) displaying in a primary window the layered drawing in an unmodified view, wherein the unmodified view displays a composite view of the plurality of overlapping layers;

(b) providing a viewport to define a first portion of the layered drawing;

(c) selecting the at least one layer from the plurality of overlapping layers to associate the at least one layer with the viewport; and (d) displaying in the viewport a modified view of the first portion of the layered drawing, wherein the modified view displays only the at least one layer selected.

11. The computer readable medium of claim 10, wherein the providing step (b) comprises:

(b1) invoking a layer viewport tool to create the viewport;

(b2) positioning the viewport over the first portion of the layered drawing; and (b3) sizing the viewport to define the first portion of the layered drawing to be displayed.

12. The computer readable medium of claim 10, the program instructions further comprising the step of:

(e) providing at least one other viewport for defining at least one other portion of the layered drawing to display.

13. The computer readable medium of claim 10, the program instructions further including comprising the step of:

(e) moving the viewport to a second portion of the layered drawing;

(f) displaying only the at least one layer selected of the second portion of the layered drawing in the viewport; and (g) restoring the first portion of the layered drawing to the unmodified view.

14. The computer readable medium of claim 10, wherein the selecting step (c) comprises:

(c1) providing a list of the plurality of layers in a flyout window;

(c2) choosing the at least one layer from the list; and (c3) associating with the viewport only the at least one layer chosen.

15. The computer readable medium of claim 10, the program instructions further comprising the step of:

(e) modifying one or more of the at least one layer selected displayed in the viewport.

16. The computer readable medium of claim 15, the program instructions further comprising the step of:

(f) saving the modifications to the one or more selected layers; and (g) closing the viewport.

17. The computer readable medium of claim 10, the program instructions further comprising the step of:

(e) locking one or more of the at least one layer selected displayed in the viewport, such that the one or more locked layers cannot be modified.

18. The computer readable medium of claim 10, the program instructions further including comprising the steps of:

(e) freezing the display in the viewport;

(f) repositioning the frozen viewport to another location on the primary window; and (g) restoring the first portion of the layered drawing to the unmodified view.

* * * * *